Aug. 28, 1951     A. V. BROGREN     2,565,717
APPARATUS FOR TUBE BENDING
Filed July 9, 1948     10 Sheets—Sheet 5
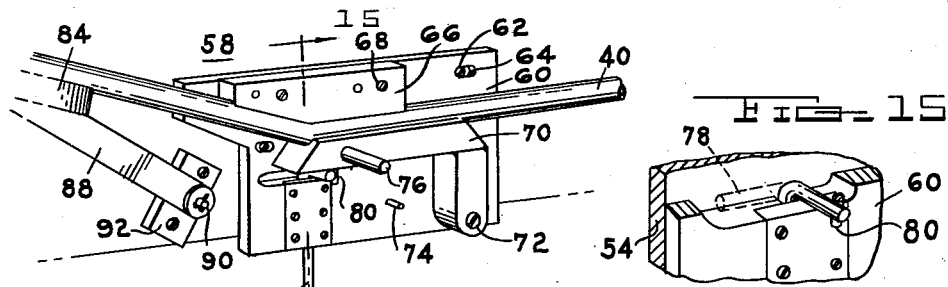
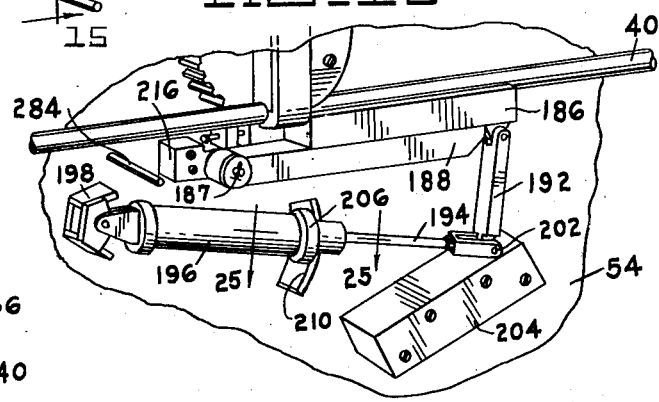
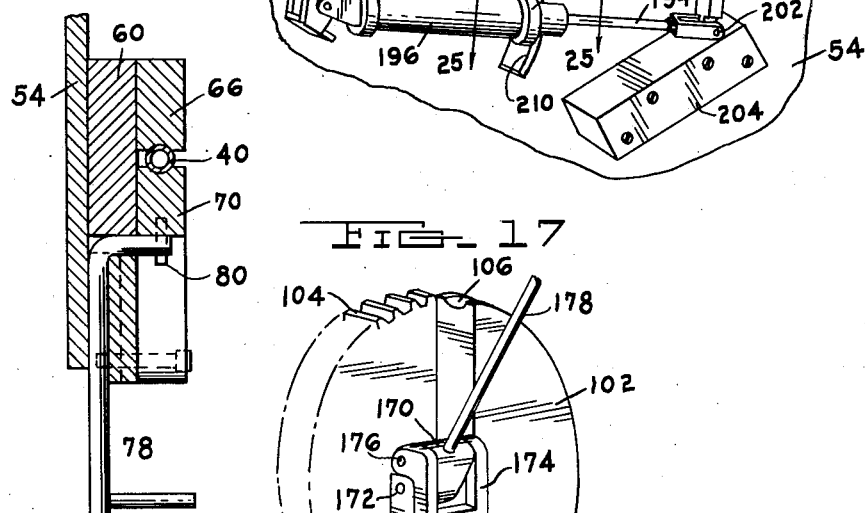
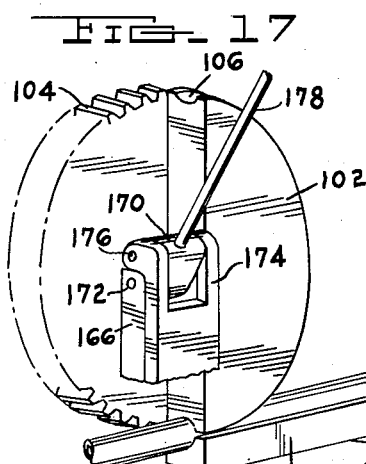
INVENTOR.
AXEL V. BROGREN
BY
Burton & Parker
ATTORNEYS

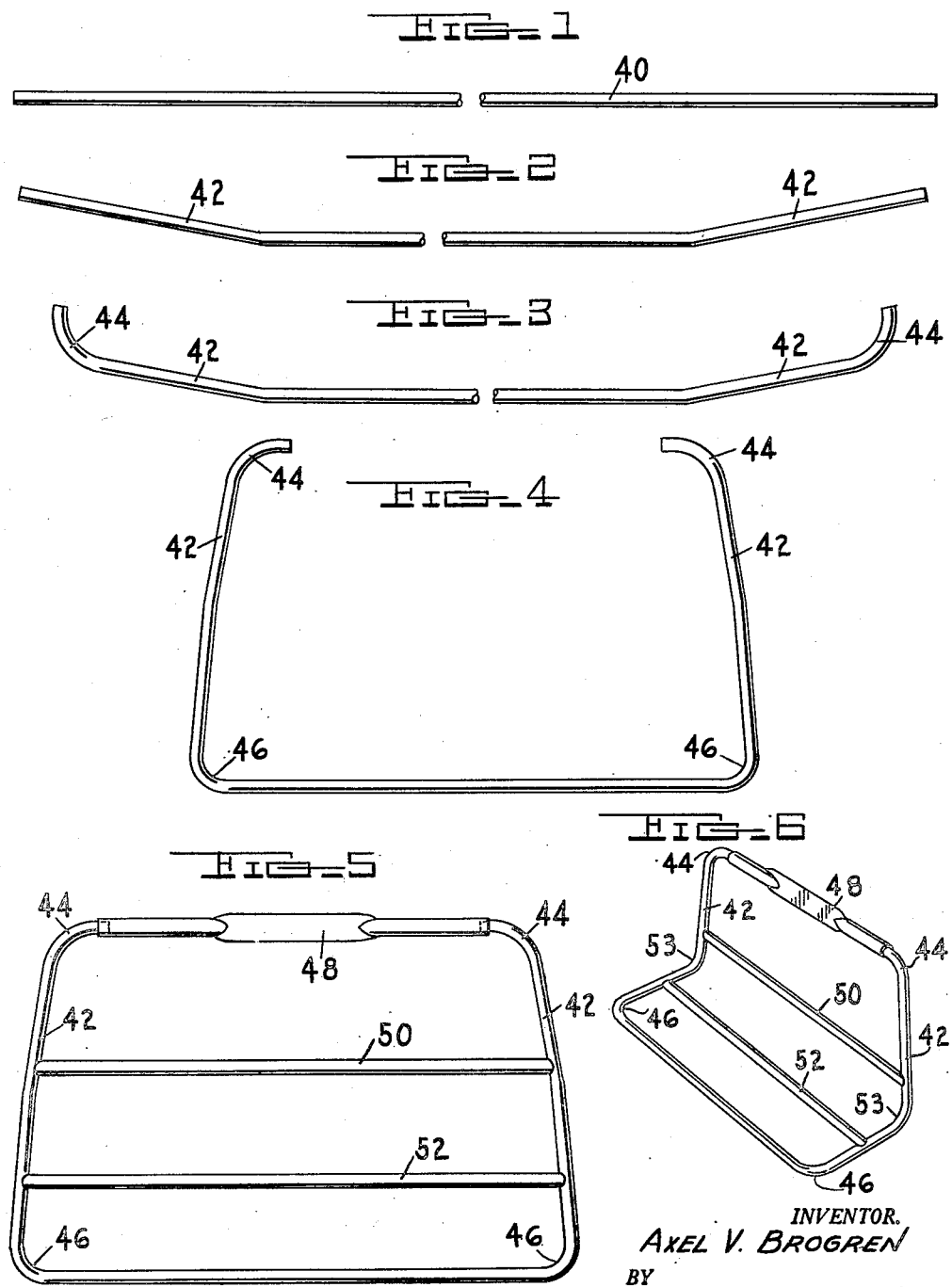

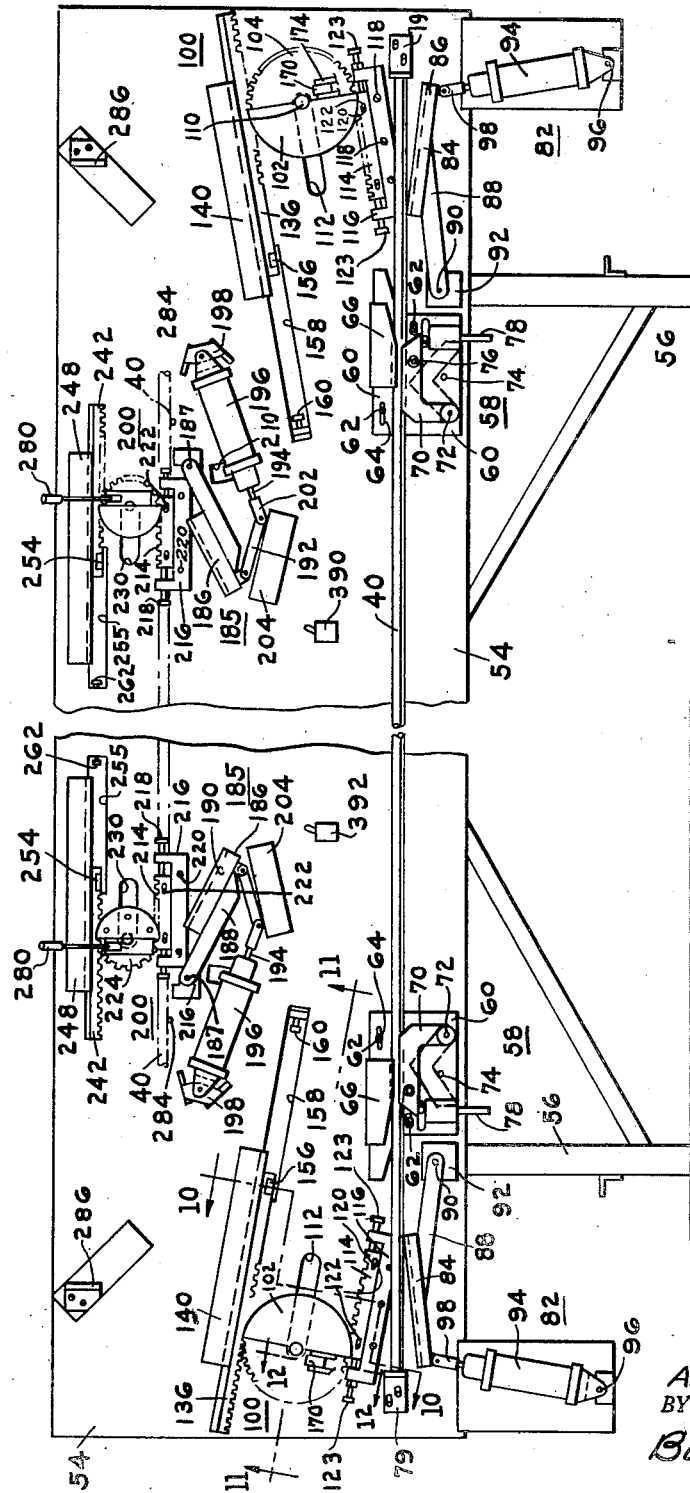

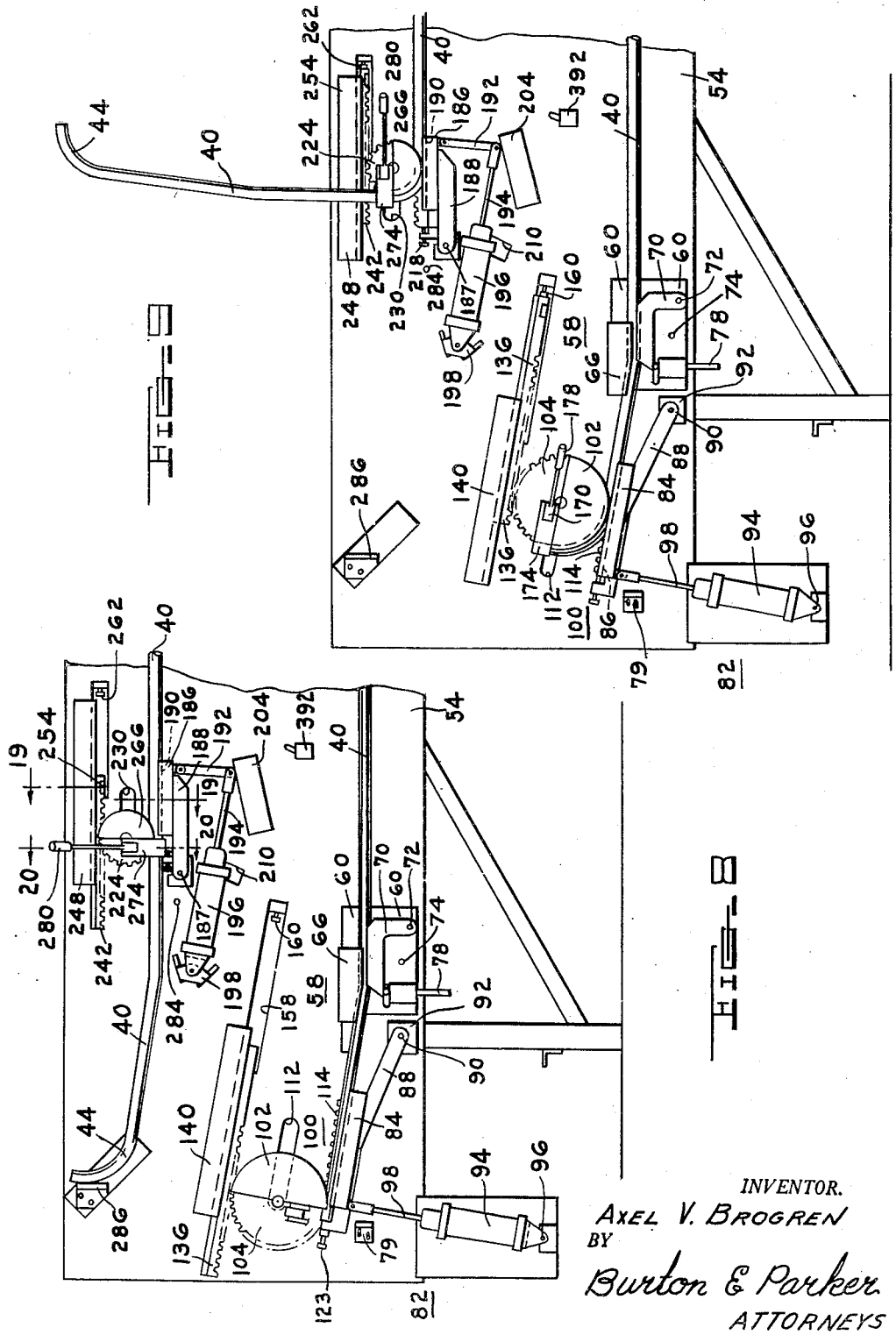

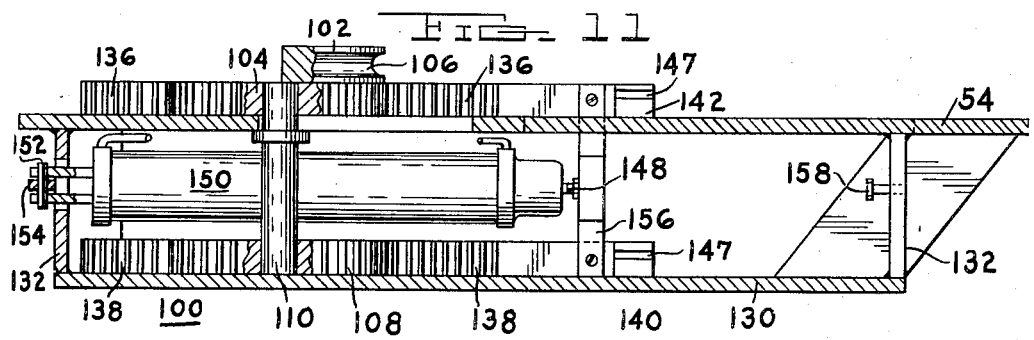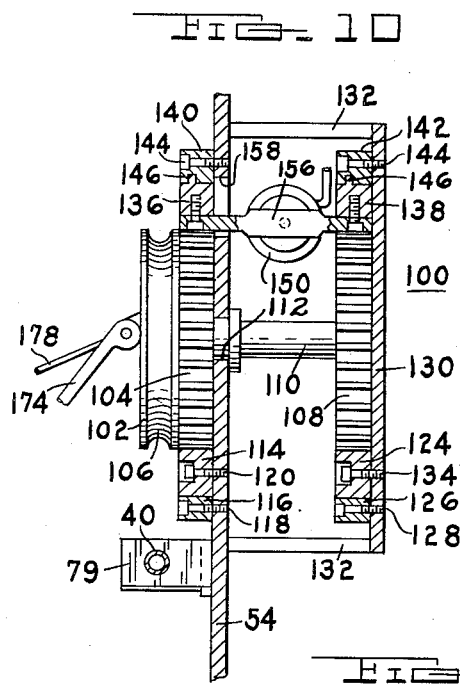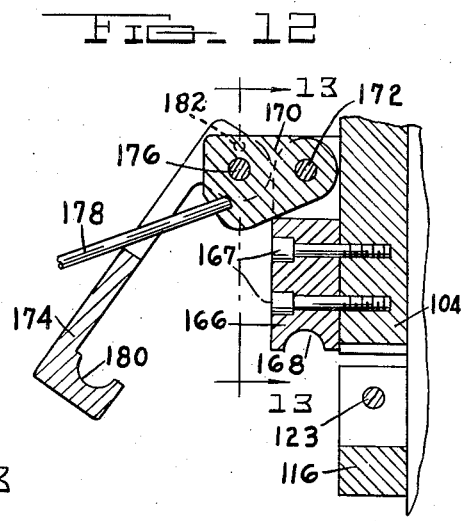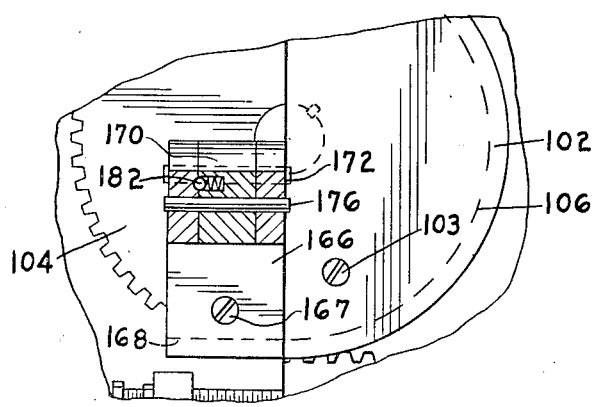

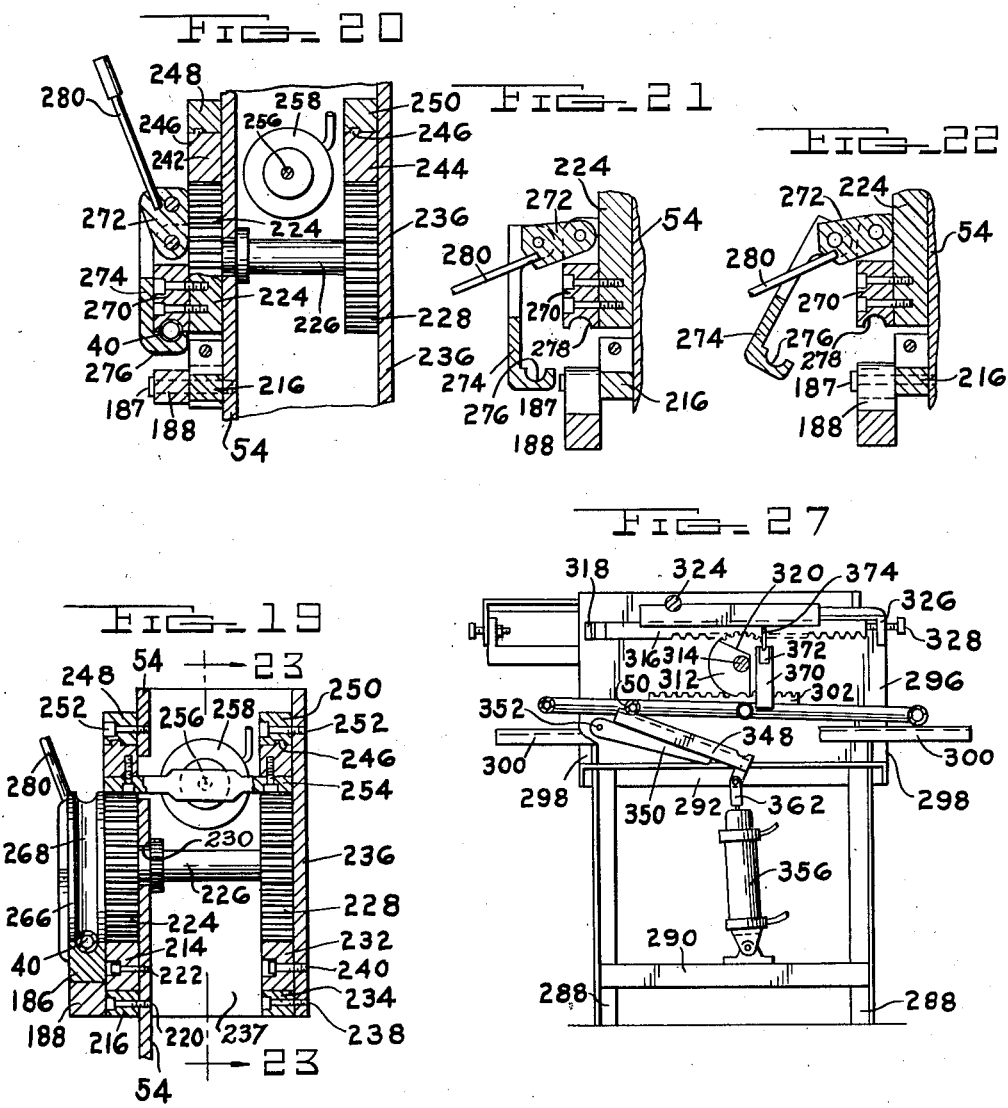

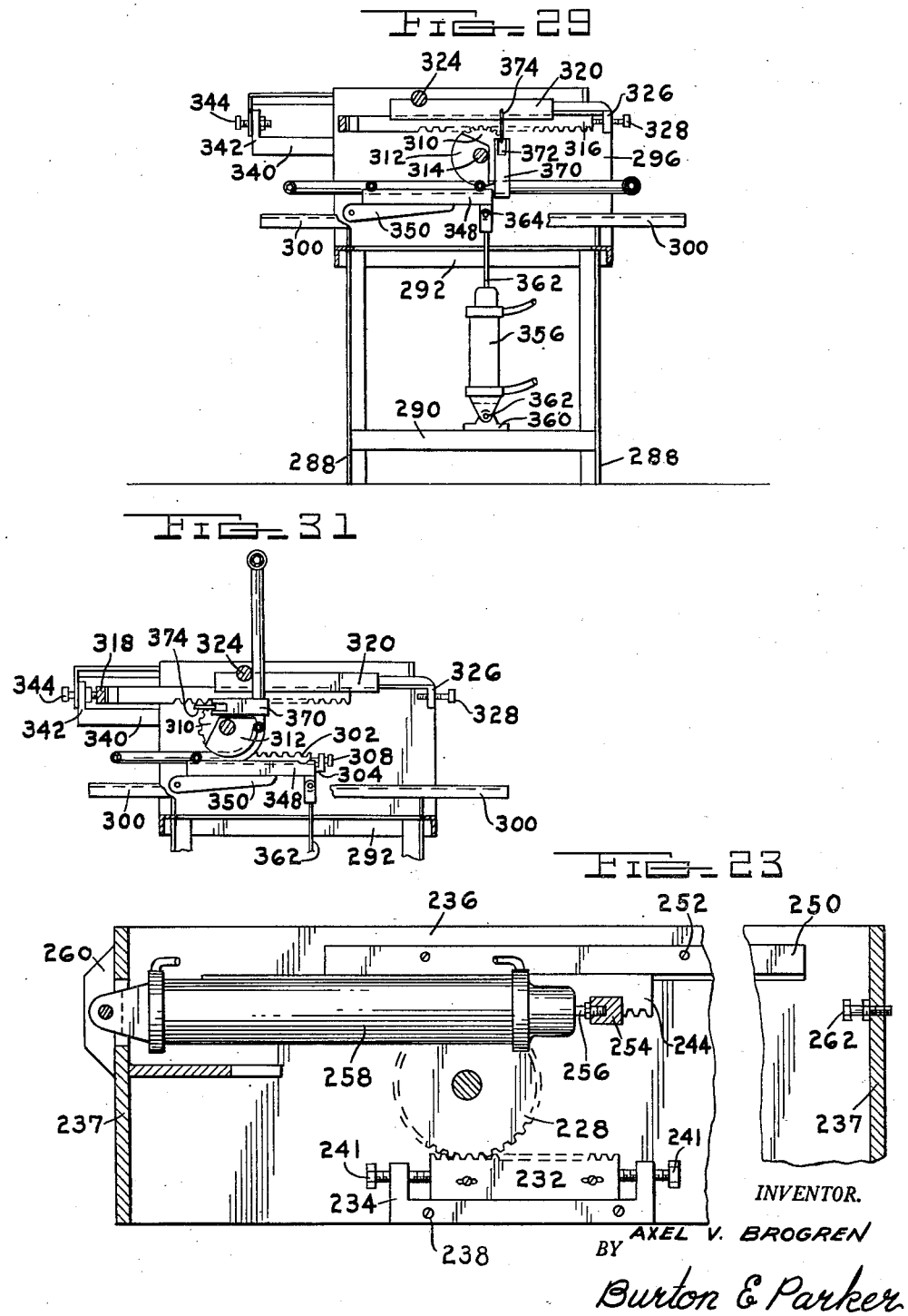

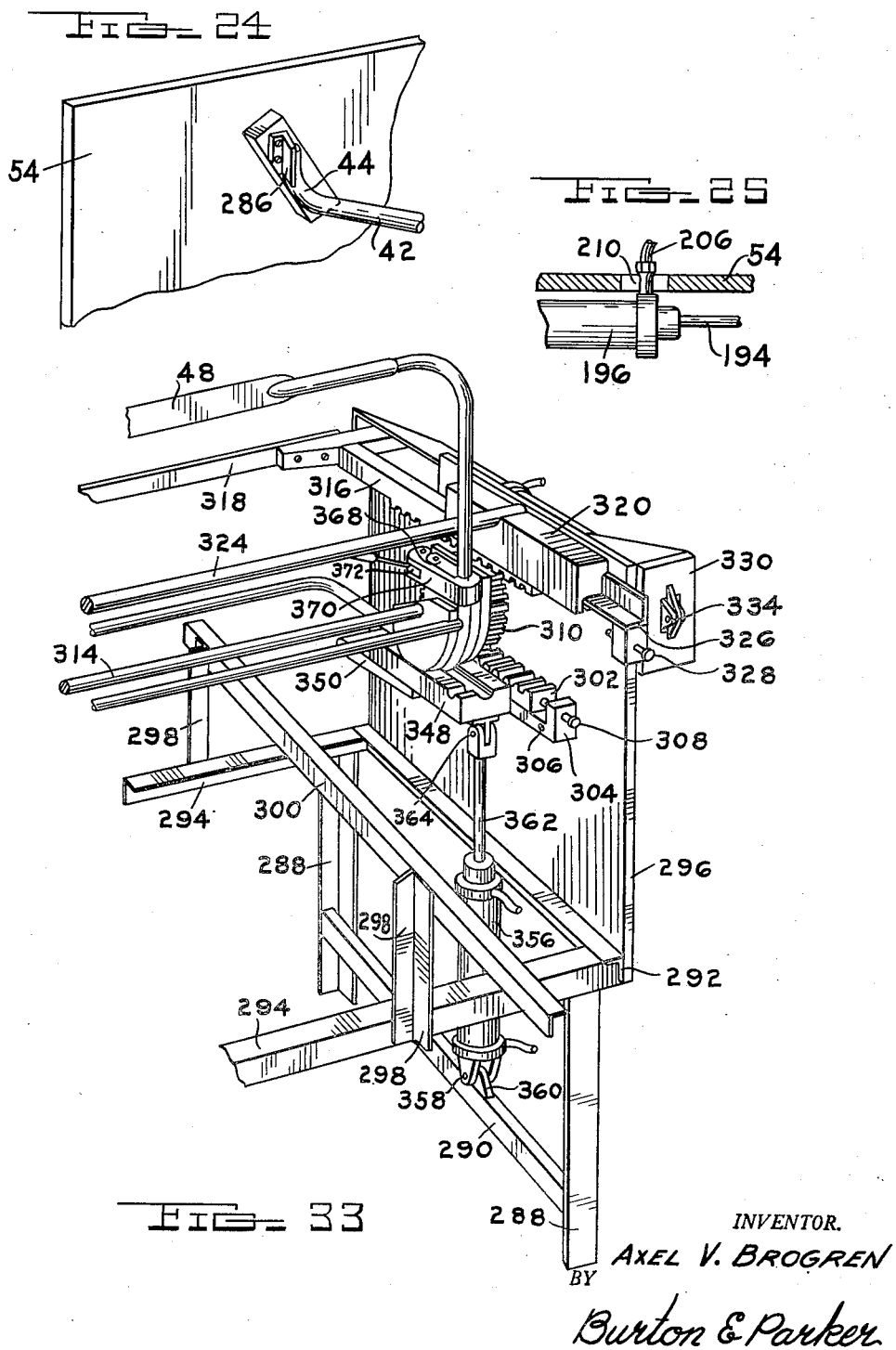

Aug. 28, 1951  A. V. BROGREN  2,565,717
APPARATUS FOR TUBE BENDING
Filed July 9, 1948  10 Sheets-Sheet 9
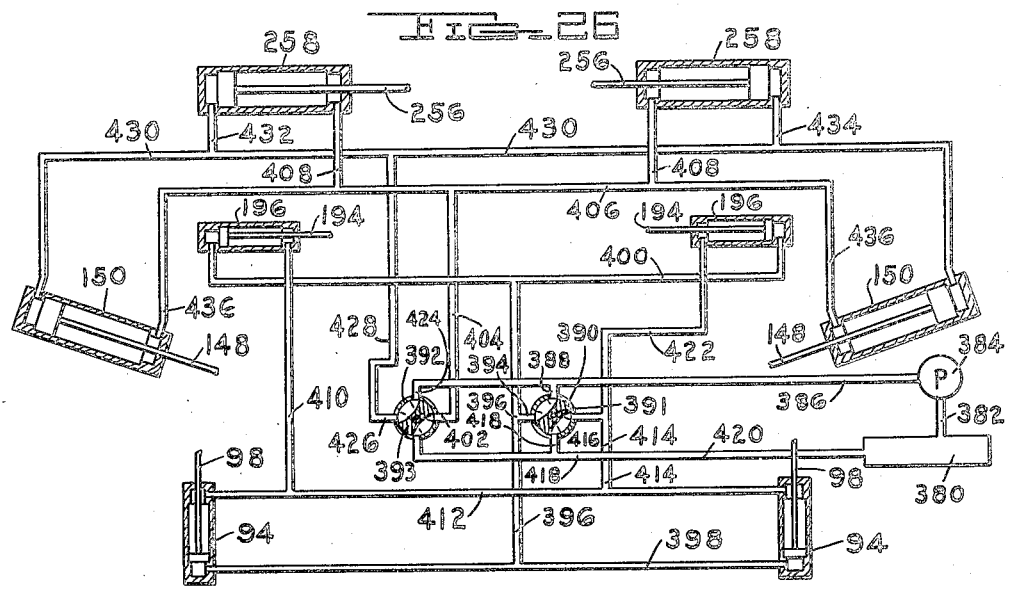
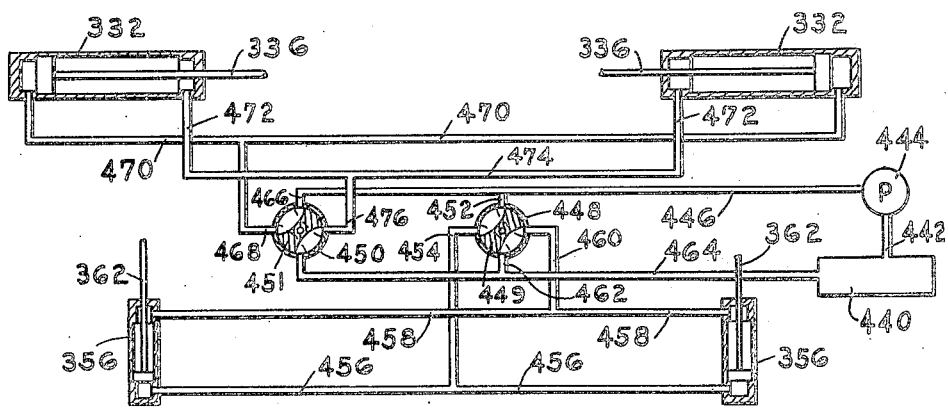
INVENTOR.
AXEL V. BROGREN
BY
Burton & Parker
ATTORNEYS

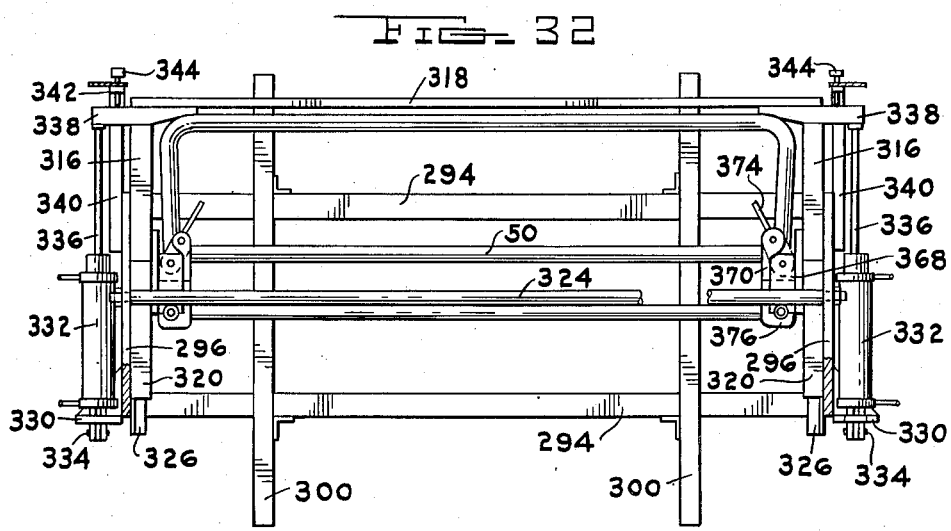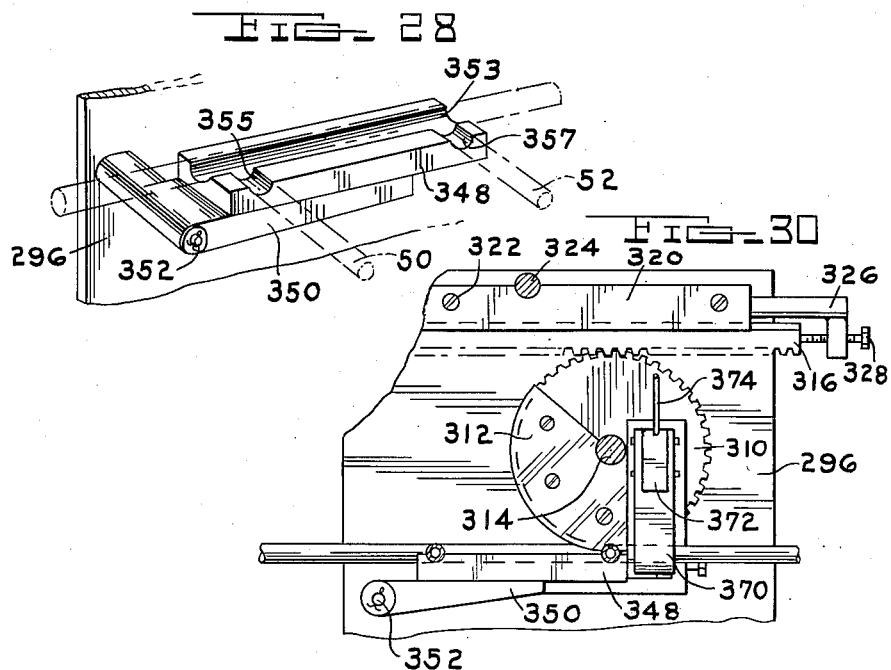

Patented Aug. 28, 1951

2,565,717

UNITED STATES PATENT OFFICE 2,565,717

APPARATUS FOR TUBE BENDING

Axel V. Brogren, Detroit, Mich., assignor, by mesne assignments, to Parsons Corporation, Detroit, Mich., a corporation of Michigan Application July 9, 1948, Serial No. 37,757

4 Claims. (Cl. 153—4)

This invention relates to an improved apparatus for bending tubes or the like.

An object is to provide an improved apparatus whereby tubes, rods or other similar elongate structural members may be bent into desired shapes quickly, easily, accurately, and without mutilation.

Another object is to provide an apparatus which requires a minimum amount of space in the shop, the apparatus being disposed largely in an upright position. The apparatus requires the attendance of a minimum number of workers. The apparatus is of simple, rugged, inexpensive construction.

An important feature of the invention is that the tubes or other pieces which are shaped by the apparatus may be bent to the desired curvature in an accurate manner without mutilation or breakage. The machine is of such a character that a long tube may have a plurality of bends simultaneously imparted thereto.

The entire apparatus herein disclosed includes two separate mechanisms. One mechanism is adapted to impart a certain series of bends to a tube. Another mechanism is adapted to thereafter impart another series of bends to the same tube. Both mechanisms may function simultaneously to carry out operations upon two separate tubes each carrying out its own series of operations.

Heretofore, tubes have been bent by wrapping the tube about a forming roll or segment which was either stationary or was rotatable about a fixed pivot. In the one case, the tube was wrapped about a stationary roll by a pressure member which was swung about the arcuate tube forming face of the roll. As it swung it bent the tube about the arcuate face of the roll. The tube was held stationary as to lengthwise movement and the pressure member was wiped over the tube about the roll. In the other case the tube was clamped to the arcuate face of a forming roll which was supported to rotate about a fixed pivot. The tube was held by a grooved block to the roll. The roll was then rotated drawing the tube lengthwise and wrapping the tube about the roll. In both cases there was danger of mutilation of the tube by drawing the tube lengthwise over a holding member or advancing a pressure member lengthwise over the tube.

In this invention the tube is wrapped about a forming roll or arcuate part which rotates about a center which center is advanced parallel to the tube. The forming roll revolves along a path parallel to the tube as the roll rotates.

More particularly an important feature of the apparatus is that it includes means for supporting a tube in part along a pathway over which a forming roll or disc is supported for rotatable travel. Means is provided for clamping one end of the supported tube to the roll to wrap about the periphery thereof as the roll revolves along the pathway thereby imparting a permanent bend to the tube. Both ends of the tube may be bent simultaneously, two forming rolls being provided to act on the two ends of the tube at one and the same time.

By securing the tube to an arcuate forming face which rotates about a center and revolves at the same time along a path parallel to the supported tube, the tube is bent without mutilation, scarring or other defacement.

Specifically the invention is illustrated in connection with the fabrication of a vehicle seat frame wherein the frame is formed of tubular members shaped to provide a seat portion and a back portion. It is apparent that the invention might be applied to the bending of tubes or other similar structural parts into other and different shapes.

The several figures of the drawings illustrate the various steps in the process of carrying out my invention as applied to the bending of a tube or pipe into the form of a tubular seat frame and illustrate the improved mechanism employed in the carrying out of such process, however the invention is applicable to the bending of tubes or the like into other structural shapes and designs. While the invention is illustrated as employed in the bending of a tube, it is, of course, applicable to the bending of rods or other elongate structural members.

Other objects, advantages and meritorious features will more fully appear from the following description, claims and drawings, wherein Fig. 1 is an elevation of a length of tubing suitable for being subjected to the process of my invention as herein disclosed.

Fig. 2 is an elevation of the tube shown in Fig. 1 following the carrying out of the first bending step in the process of this invention.

Fig. 3 is an elevation of the tube shown in Fig. 1 following the completion of the second bending step in the process of this invention.

Fig. 4 is an elevation of the tube shown in Fig. 1 following the completion of the third bending step in the process of this invention.

Fig. 5 illustrates the tubular form shown in Fig. 4 following the welding of three separate tubular inserts thereinto as shown.

Fig. 6 illustrates the tubular structure of Fig. 5 following the completing of the bending operation in the process of forming a tubular seat frame.

Fig. 7 is an elevation, partly broken away, illustrating a portion of the mechanism adapted for the carrying out of the complete process of Figs. 1 to 4.

Fig. 8 is an elevation of a fragment of the structure shown in Fig. 7 and also illustrating the completion of the first bending step in the process of this invention.

Fig. 9 is an elevation of the structure shown in Fig. 8 and differing therefrom only in that the working mechanism and the tube operated upon thereby is illustrated at the completion of the second bending step and at the completion of the third bending step in the process.

Fig. 10 is an enlarged sectional view taken on the line 10—10 of Fig. 7.

Fig. 11 is an enlarged sectional view taken on the line 11—11 of Fig. 7.

Fig. 12 is an enlarged sectional view taken on the line 12—12 of Fig. 7.

Fig. 13 is a sectional view taken on the line 13—13 of Fig. 12.

Fig. 14 is a perspective of that portion of the structure shown in Fig. 8 which embodies the stationary tube clamping mechanism.

Fig. 15 is a sectional view taken on the line 15—15 of Fig. 14.

Fig. 16 is a perspective of a fragment of the mechanism shown in Fig. 14 illustrating the retainer latch for the clamp member.

Fig. 17 is a perspective of a fragment of one of the lower rotatable tube forming segments and associated clamping fixture.

Fig. 18 is a perspective of a fragment of the tube supporting mechanism associated with the upper rotatable tube forming gear and segment.

Fig. 19 is a sectional view taken on the line 19—19 of Fig. 8.

Fig. 20 is a sectional view taken on the line 20—20 of Fig. 8 showing the rotatable tube forming segment and gear showing the clamping fixture closed locking a tube to the forming segment.

Fig. 21 is a sectional view taken on substantially the same line as the view of Fig. 20 showing the clamping fixture partly open.

Fig. 22 is a sectional view taken on substantially the same line as the views of Figs. 20 and 21 showing the clamping fixture open.

Fig. 23 is a sectional view taken on the line 23—23 of Fig. 19.

Fig. 24 is a fragmentary perspective of a positioning stop for one end of the tube shown in Fig. 7.

Fig. 25 is a fragmentary sectional view taken on the line 25—25 of Fig. 18.

Fig. 26 is a diagrammatic illustration of hydraulic mechanism adapted to operate the mechanical structure shown in Figs. 7 through 25.

Fig. 27 is an end view of the mechanism provided to bend the tube from the shape shown in Figs. 4 and 5 to that shown in Fig. 6.

Fig. 28 is a perspective of a fragment of the tube bending support shown in Fig. 27.

Fig. 29 is an end view of the mechanism shown in Fig. 27 illustrating the tube holding clamp closed and holding the tube against the rotatable forming segment.

Fig. 30 is an elevation of a fragment of the structure shown in Fig. 29.

Fig. 31 is an end elevation of a fragment of the mechanism shown in Fig. 29 illustrating the position of the parts following the bending of the tube into the form shown in Fig. 6.

Fig. 32 is a plan of the machine shown in Figs. 27 and 29 but illustrating the same following the bending operation illustrated in Fig. 31.

Fig. 33 is a perspective of a broken away fragment of the machine shown in Figs. 27, 29 and 32 showing the parts following the bending operation illustrated in Fig. 32.

Fig. 34 is a diagrammatic illustration of a hydraulic system provided to actuate the mechanism shown in Figs. 27 through 33.

To recapitulate the figures, Fig. 1 illustrates a section of tubing adapted to be employed in the forming of a tube frame for a seat such as shown in completed form in Fig. 6. Figs. 2 through 5 illustrate this piece of tubing at various stages in the formation of the tubular frame of Fig. 6. Fig. 7 through 25 illustrates the mechanism wherein the tube shown in Fig. 1 is bent into the shape shown in Fig. 4 and Fig. 26 illustrates diagrammatically a hydraulic system which is coupled with and actuates the mechanism shown in Figs. 7 through 25. Figs. 27 through 33 illustrate the mechanism wherein the tubular frame shown in Fig. 4 and Fig. 5 is bent into the form shown in Fig. 6, and Fig. 34 diagrammatically illustrates a hydraulic system which is coupled with the mechanism shown in Figs. 27 through 33 to operate the same.

In the forming of a tubular seat frame a piece of tubing or pipe 40, Fig. 1, of the required length and diameter is first subjected to a bending operation which bends up the opposite end portions as at 42, Fig. 2. The extreme ends of these bent up end portions 42 of the tube are then rolled as at 44 into the shape shown in Fig. 3. The tube shaped as shown in Fig 3 then is bent as at 46 into a U-shape as shown in Fig. 4. A separate tube section 48 is then welded between the opposite free ends 44 of the U-tube shape. Separate tube sections 50 and 52 are likewise welded into place as shown in Fig. 5. This forms a flat frame structure of the character shown in Fig. 5. Such flat tubular frame is then bent as at 53 to form the frame for a seat as illustrated in Fig. 6. These operations are carried out in the process herein described and by the employment of the two mechanisms illustrated generally in Figs. 7 and 27.

The structure shown generally in broken away elevation in Fig. 7 and in the various detail views 8 through 25 is the mechanism whereby a straight length of tube 40 illustrated in Fig. 1 is bent through successive steps into a U-shape as shown in Fig. 4. Such mechanism and its operation by the hydraulic system disclosed in Fig. 26 will be first described.

This structure comprises a flat foundation board 54 supported in a generally upright position, sloping slightly rearwardly for convenience, by legs 56. Due to the upright position of this board which carries the operating mechanism and the hydraulic system, the structure occupies only a relatively small amount of floor space within a shop. The tube engaging clamps and forming tools are mounted on the front face of the board as shown in Fig. 7. The hydraulic mechanism is mounted in part upon the front face of the board and in part upon the rear face thereof. The construction is such that the two opposite end portions of a tube are simultaneously shaped. The two opposite end portions of the board are provided with complementary clamping and shaping devices.

A pair of similar tube clamping assemblies 58 are mounted on opposite end portions of the board (Fig. 7). Each assembly comprises a base plate 60 secured by screws 62 to the foundation board 54, Fig. 7. The screws 62 extend through slots 64 in the base plate 60 whereby the plate may be adjustably positioned upon the board within the limits of the slots. A stationary tube clamping and bending block 66 is fixed to the plate 60 by pins 68 (Fig. 14). This block is provided with a bottom working face grooved to form a seat for the tube as shown in Figs. 14 and 16. This working face is of angular contour as illustrated.

An L-shaped tube clamping member 70 is pivoted at 72 to the plate 60 for swingable movement from the open position shown in dotted outline at the bottom of the sheet in Fig. 7. In the open position a tube may be inserted between this swingable clamp 70 and the stationary clamp 66, and the swingable clamp 70 may then be moved to the closed solid line position. The swingable L-clamp is provided with a handle 76 Fig. 14). In the open position the clamp is supported upon a stop pin 74. In the closed position the clamp is supported upon a rotatable latch 78.

The latch 78 is journalled within the plate 60 for rotation about a vertical axis from the operative position shown in solid line in Figs. 14 and 16; at which position the L-clamp is held elevated thereby, to the inoperative position shown in dotted outline in Fig. 15. When the latch is in the inoperative position the L-clamp 70 is permitted to fall down to the inoperative position shown in dotted outline shown in Fig. 7. A stop pin 80 determines the operative position of swing of the latch 78 as shown in Figs. 14 and 16. When a length of tubing is inserted in place as shown in Fig. 7, the opposite ends of the tube are positioned by positioning blocks 79 as shown in Fig. 7.

A pair of hydraulically actuated tube bending assemblies are provided and identified generally by the numerals 82 (Fig. 7). These assemblies are mounted upon opposite ends of the board 54 in proximity to the pipe clamping assemblies 58 described above. The two assemblies 82 are similar. They are designed to act simultaneously upon opposite ends of the length of tubing as herein described.

Each assembly 82, as shown in larger detail in Figs. 8 and 9, comprises a tube supporting and bending block 84 having an upper working face grooved as indicated in dotted line at 86 in Figs. 8 and 9 to seat a length of tubing as shown particularly in such figures. This block 84 is mounted upon the free end of a link 88 which link is pivoted at its opposite end upon a pivot 90 for raising and lowering of the block 84 to bend the tube as shown in Fig. 9. The pivot 90 is carried by a plate 92 which plate is fixed to the board 54.

A pair of hydraulic piston and cylinder assemblies, each comprising a cylinder 94 pivotally supported at 96 and a piston 98 reciprocally mounted within the cylinder and connected at its outer end with the block 84, are provided to swing the blocks 84. The piston is adapted to raise the block 84 from the position shown in Fig. 7 to that shown in Fig. 8 to bend the end of the tube supported upon the block, as shown at 42. As shown in Fig. 7 these swingably supported blocks 84 are provided in pairs and the hydraulic cylinders are provided in pairs, one for each end of the board.

A pair of hydraulically operated tube forming assemblies indicated generally as 100 are also shown in Fig. 7. These assemblies are mounted upon opposite ends of the board 54 and adapted to roll opposite ends of the tube as shown at 44 in Fig. 3. These two assemblies are similar and are adapted to be simultaneously hydraulically actuated to simultaneously bend the opposite ends of the tube.

Each assembly 100 comprises a tube forming roll or half-circular segment 102 fixed in any suitable manner to the outer face of a gear wheel 104. This gear wheel is supported for rotatable travel to wrap the end of the tube 40 about the periphery of the segment 102 to which it is clamped as shown in Fig. 9. The periphery of the segment is grooved as at 106 (Figs. 10 and 17) to receive and seat the tube as shown in Figs. 9 and 17. The gear 104 forms one of a pair of gears. The cooperating gear of the pair is indicated as 108. The two gears are mounted on opposite ends of an axle 110 (Fig. 10). The axle extends through a slot 112 (Fig. 8) in the board 54 to travel lengthwise therethrough as the gears revolve.

The gear 104 is supported upon a stationary rack 114 which is mounted upon the front face of the board. This rack is mounted for lengthwise adjustment upon a supporting bar 116 carried by the board. The supporting bar 116 is secured to the board 54 by screws 118. The rack is held to the board by screws 120 (Fig. 7) which screws 120 extend through slots 122 in the rack so as to permit slidable lengthwise adjustment of the rack upon the bar over the board. Adjustable stops 123 (Fig. 7) are provided in the opposite ends of each supporting bar to engage the ends of the rack 114 mounted upon the bar.

The gear 108, which is located at the rear of the board, is supported upon a stationary rack 124 carried by a bar 126 which bar is secured by screws or the like 128 to a foundation plate 130 which plate is secured in spaced relationship from the board 54 by struts 132. The rack 124 is adjustable upon its supporting bar 126 in the same manner as rack 114 was heretofore described as being adjustable upon its supporting rack 116, being provided with pins 134 carried by the plate 130 and extending through slots in the rack.

Travel of the gears 104 and 108 over the stationary racks 114 and 124 is provided for by linear movement of slidable racks 136 and 138 respectively. These tracks 136 and 138 travel over guide bars 140 and 142 respectively. The guide bars 140 and 142 are secured by screws 144 to the board 54 and the plate 130, respectively. The slidable racks 136 and 138 are held to the guide bars 140 and 142 by splines 146 (Fig. 10) received in splineways 147 formed in the guide bars 140 and 142 (Fig. 11) for guided travel therethrough.

These racks are actuated by the piston 148 of a hydraulic piston and cylinder mechanism. The hydraulic cylinder 150 (Fig. 11) is pivotally supported at its closed end upon pivot 152 carried by bracket 154 which bracket is in turn carried by a strut 132. The free end of piston 148 is coupled with the slidable racks by cross-head 156 (Fig. 11) which cross-head extends through a slot 158 cut in the board 54, Figs. 7 and 10. An adjustable screw stop 160 is threaded into a strut 132 providing a limit of slidable travel for the racks 136 and 138 by engaging the cross-head 156 of the piston which cross-head connects the racks 136 and 138 together (Fig. 11).

Clamping mechanism is provided to hold one end of the tube 40 to the grooved periphery 106 of the segment 102 (Figs. 9 and 12). This clamp comprises a supporting base 166 secured to the gear 104 by screws 167 or the like (Fig. 12). The lower end of this base member is grooved as at 168 (Fig. 12) in line with the groove 106 formed in the periphery of the forming segment 102 which segment is also attached to the gear 104.

The upper end of this base member is forked to receive one end of a link 170 pivoted therein upon pivot 172. To the opposite end of the link is pivoted a clamp 174 by a pivot pin 176 (Figs. 12 and 17). The link is provided with a handle 178 to swing the link to tighten the clamp 174. The lower end of the clamp is provided with a claw or hook 180 (Fig. 12) adapted to engage a tube seated within the groove 168 of the base member 166 of the clamping mechanism.

A spring urged ball 182 (Figs. 12 and 13) is provided to releasably hold a clamp 174 in the open position to permit seating of a tube against the grooved periphery 106 of the segment 102 and against the grooved end 168 of the clamping base member 166 as shown in Fig. 12. When the handle 178 is thrown upwardly as shown in Fig. 9 the hook end 180 of the clamp proper 174 engages and holds the tube snugly against the grooved end 168 of the base member 166 of the clamping mechanism and therefore also holds the tube against the grooved periphery 166 of the segment 102 so that when the segment rotates with the gear 104 the tube is wrapped about the segment to form the bend 44.

The operation of the hydraulic system will be described hereafter but after a length of tubing has been bent to the form shown in Fig. 3, having bends 42 and 44 placed therein by the mechanism hereinabove described, such length of tubing is removed from the clamping assembly 58 and the clamping devices which secured it to the rotating segments. Such partially formed tube is then transferred to a pair of upper clamping assemblies to have its opposite ends bent to form the U-shaped structure shown in Fig. 4.

These upper clamping assemblies and tube bending assemblies are generally similar to those heretofore described. They are provided in pairs at opposite ends of the board. Figs. 7, 8 and 9 show the mechanisms. In Fig. 7 each of a pair of hydraulically operated tube supporting assemblies is indicated by the numeral 185 and each of a pair of rotatable tube forming segment assemblies is indicated by the numeral 200.

These two assemblies are connected in the hydraulic system as hereinafter described so that the two pipe supporting assemblies function simultaneously to support both ends of a length of tubing. The two rotatable tube forming assemblies function simultaneously to bend opposite ends of the same tube.

Each tube supporting assembly comprises a tube supporting block 186 mounted upon the free end of a lever 188 which lever is swingable from its opposite end which is pivotally supported at 187. The upper working face of the block is grooved at 190 to receive and seat a tube (Figs. 8 and 18).

The lever and block are adapted to be lifted by a hydraulically operated piston and cylinder mechanism through a link 192 pivotally coupled at one end to the block 186 and at the opposite end to the piston 194. The piston is reciprocable within a cylinder 196. The opposite end of the cylinder is pivotally mounted upon a bracket 198 carried by the board 54 (Fig. 18). A coupling 202 at the outer end of the piston 194 is adapted to slide over an inclined plane 204 secured to the board 54 to lift the block 186. As the block is lifted, the lever 188 and the piston and cylinder assembly are swung so that the block moves from the open position shown in Fig. 7 to the closed positions shown in Figs. 8 and 9.

Figs. 25 and 18 show the free end of the cylinder supported for sliding movement. There is a flexible hose connection 206 which is connected with the swinging end of the cylinder 196 and forms a part of the hydraulic system. As a matter of fact there is a flexible hose connection to the swinging end of each cylinder connected in the hydraulic system.

The two rotatable gear segment assemblies 200 are similar and are similar to the rotatable gear assemblies 100 heretofore described. There is a lower stationary rack 214 carried by a rack supporting bar 216. This bar is provided with stop screws 218 extending through opposite ends of the bar and adapted to form stops to regulate the adjustment of the rack 214 upon the bar. The bar is secured to the board 54 by screws 220. Screws 222 extend through the board and through slots provided in the rack 214 to secure the rack to the board while permitting lengthwise adjustment of the rack upon the bar. A gear wheel 224 is supported upon the rack 214. This gear wheel is mounted upon one end of an axle 226.

A corresponding gear wheel 228 is mounted upon the opposite end of this axle. The board 54 is slotted as at 230 to pass the axle 226 therethrough. A stationary rack 232 is supported upon the bar 234 which bar is secured to a foundation plate 236 which foundation plate is secured in spaced relationship to the board 54 by struts 237 (Fig. 23) as hereinabove described in connection with the base plate 130. The bar 234 is secured by screws 238 to the plate 236 and the rack 232 is adjustably mounted upon the bar and is secured to the plate 236 by the screws 240 which screws extend through slots in the rack. Stops 241 are provided in opposite ends of the bar 234 (Fig. 23) to adjustably position the rack 232 upon the bar. The gear wheels 224 and 228 travel over the stationary racks 214 and 232 and are actuated by the slidable racks 242 and 244, respectively.

The racks 242 and 244 are slidably coupled by splines 246 with rack guide bars 248 and 250, respectively, which guide bars are secured respectively to the board 54 and to the plate 236 by screws 252. The sliding racks 242 and 244 are connected by a cross-head 254 which cross-head is coupled with the outer end of a piston 256. The piston is reciprocable within a hydraulic cylinder 258. The cross-head 254 extends for travel through a slot 255 formed in the board 54 and similar to the slot 158 formed therein and previously described. The opposite end of the cylinder 258 is pivotally supported upon a bracket 260 mounted upon a strut 237 (Fig. 23) and an adjustable stop 262 in a cooperating strut 237 establishes a limit of movement for the piston and the racks.

Each gear 224 is provided with a half circular tube forming segment 266 secured thereto to rotate therewith. The periphery of this segment is grooved as at 268 to form a seat to receive a tube as illustrated in Fig. 19. This construction is similar to that of segment 102 previously described. Mounted upon the gear wheel 224 is clamping mechanism similar to the clamping mechanism hereinabove described and mounted upon the gear wheel 104.

The clamping mechanism comprises a foundation plate 270 secured by screws or the like to the gear wheel 224 (Figs. 20 through 22). A link 272 is pivoted within the forked upper end of this foundation plate. The clamp proper 274 is pivoted to the outer end of the link. The opposite end of the clamp is in the form of a hook or jaw 276 shaped to seat over the tube 40 to draw it into the grooved lower end 278 of the plate 270 and against the grooved periphery of the forming segment 266. The link 272 is provided with the handle 280 whereby the link may be swung to pull the hook end of the clamp up tightly against the tube as shown in Figs. 19 and 20. In Fig. 22 the clamp is shown open. In Fig. 20 it is shown closed against the tube 40. The pivoted end of the clamp and link is swung inwardly toward the board 54 over the center of pivot of support for the link.

When the tube supporting assemblies 185 are opened as shown in Fig. 7 a tube section 40 is placed first upon stationary supporting pins 284 (Fig. 7) which pins are fixed to the board 54. The opposite curved ends 44 of the tube are positioned against fixed abutments 286 on the board 54 (Figs. 8 and 24).

When the tube supporting assemblies are hydraulically operated, the tube is elevated from the position shown in dotted outline in Fig. 7 to that shown in Figs. 8 and 9 and the clamping mechanisms are manually actuated as described to clamp the tube to the tube shaping segment.

Fig. 26 is a diagram of the hydraulic system which is employed to actuate the mechanism hereinbefore described and which carries the process to the point of forming the tube into the shape shown in Fig. 4. This hydraulic diagram will be described hereinafter along with the description of Fig. 34 in connection with the description of the operation.

Figs. 27 through 33 describe mechanism which is actuated by the hydraulic system shown in Fig. 34 and which is adapted to bend the tubular frame illustrated in Fig. 5 into the form illustrated in Fig. 6. This structure is separate from that shown in Figs. 7 through 25 but functions to carry out and continue the same process of forming a tubular seat frame and in large part embodies correspondingly similar mechanism. This structure is mounted upon a stand such as shown in Figs. 27 through 33.

The stand has legs 288. The end legs are connected by lower cross-pieces 290 and upper cross-pieces 292. Upper front and rear cross-pieces 294 connect the legs at one end at the top with the legs at the opposite end. End plates 296 extend upwardly from the upper end cross-pieces 292 to support racks and other operating mechanism. A pair of standards 298 project up from the front and rear cross-pieces 294 adjacent each end of the stand and a supporting bar 300 is mounted upon the upper ends of each pair of standards. Two of such supporting bars 300 are provided (Fig. 32).

A rotatable gear 310 carrying a tube forming segment 312 is supported upon a rack 302 on each end plate 296 and is adapted to be driven by a hydraulically operated rack 316. These two gear and rack assemblies are similar. They are generally similar to the rotatable gear and tube forming segment assemblies heretofore described. There is a stationary lower rack 302 supported upon a bar 304 which bar is secured to the inner face of an end plate 296 by screws 306 or the like. The bar is provided at its ends with positioning pins 308 adapted to adjustably position the rack 302 thereon. A gear wheel 310 is supported upon the rack 302 to travel thereover. A segment 312 of a circular disc is fixed to the gear wheel to rotate therewith. The periphery of this segment is grooved to seat a tube as shown in Figs. 30 and 33. Two of these gear wheels 310 are provided. They are mounted upon opposite ends of an axle 314. They are disposed adjacent to the inner faces of the end plates 296 which carry the racks 302.

There are provided reciprocally supported upper racks 316 one adjacent to each end plate and adapted to cooperate with the gears 310. These racks are connected together at their rear ends by a cross-bar 318. They are driven by a pair of hydraulically operated pistons which form part of a pair of piston and cylinder assemblies mounted upon the outer faces of the end plates 296.

Each upper rack is slidably coupled with a stationary bar 320 secured to the inner face of the end plate 296 along its top margin by screws 322 or the like (Fig. 30). These two bars 320 are connected together as are the opposite end plates 296 by a tie rod 324 (Fig. 31). The racks are slidable through a guideway in the underface of each bar. A bracket 326 projects from the front end of each bar and has a depending end portion provided with an adjustable stop pin 328 which forms a positioning rest for the forward slidable travel of the rack 316.

A hydraulic piston and cylinder assembly is mounted on the outer face of the end plate 296. There is a bracket 330 secured to the outer face of each end plate 296. One end of the cylinder 332 is journalled by a pivot pin 334 to this bracket 330 as shown in Figs. 32 and 33. This cylinder is provided with a piston 336 which is reciprocably mounted therein. An arm 338 extends from the outer end of this piston to the adjacent rack 316 to reciprocate such rack. Inasmuch as the two racks 316 are connected by the cross-piece 318 and the pistons are simultaneously hydraulically actuated the racks move in unison to rotate the gears 310 over the stationary racks 302.

An arm 340 projects from each end plate 296 as shown in Fig. 32. Each arm 340 is provided with an upstanding rear end portion 342 which carries an adjustable stop 344 to provide a rest for the rearwardly outward travel of the hydraulic piston actuated racks 316.

A pair of hydraulically actuated tube forming supporting assemblies are provided one upon each end plate 296. These two assemblies are similar. Each assembly comprises a tube engaging and supporting block 348 which is mounted upon the outer end of a lever 350 which lever is pivoted at its opposite end at 352 to the end plate 296. The upper working face of the block 346 is grooved as at 353 (Figs. 28 and 33) to seat a tube therein and hold such tube against a correspondingly grooved working face of the rotatable forming segment 312.

In Fig. 27 the tube supporting block 348 is shown as lowered and open. In Fig. 29 it is shown as elevated raising the tube frame. A tubular frame of the shape shown in Fig. 5 is first seated upon supporting bars 300 as shown in Fig. 27 with the cross-piece 50 seated in notches 355 formed in the blocks 348. Such blocks have notches 357 for the other cross-piece 52 and the ends of the tubular frame seat in the groove 353 in the working face of the block.

This block 348 and lever 350 is elevated by hydraulic mechanism in the form of a hydraulic piston and cylinder assembly at each end of the stand. There is a hydraulic cylinder 356 journalled at 358 upon a bracket 360 which bracket is carried by the lower cross-member 290. A piston 362 is reciprocable within the cylinder and the upper end of the piston is pivoted at 364 to the underside of the block 348 to lift the block from the position shown in Fig. 27 to that shown in Fig. 29. Such elevation of the block lifts the tubular frame off of the supports 300 and to the position shown in Fig. 29.

Each gear wheel 310 is provided with clamp mechanism similar to the clamp mechanism heretofore described in connection with the construction shown in Figs. 7 through 25. There is a base portion 368 of the clamp which is fixed to the gear wheel 310. To one end of this base portion 368 there is pivoted a clamp proper 370 by means of a link 372. This clamp 370 has a hook shaped outer end 376 (Fig. 32) which is shaped to engage and seat over a tube and hold such tube snugly against the grooved end of the base portion 368 and against the grooved periphery of the segment 312. When the gear wheel is rotated and rotates the segment 312 therewith, the tube which is held thereto is wrapped thereabout as shown in Figs. 31 and 32.

Fig. 26 illustrates diagrammatically the hydraulic system adapted to operate the mechanism shown in Figs. 7 through 25. There is a liquid reservoir 380 which communicates through a lead 382 with a source of liquid developing pressure 384. A pressure line 386 extends from the source of pressure 384 to each of the two valves 390 and 392. These valves are manually controlled being provided respectively with manually rotable valve members 391 and 393. Valve 390 controls delivery of liquid pressure to the two cylinders 94 and to the two cylinders 196. Valve 392 controls delivery of liquid pressure to the two cylinders 150 and to the two cylinders 258.

In the operation of the mechanism shown in Fig. 7 a straight length of tubing 40 is placed upon the board to be gripped by the two clamping assemblies 58 as hereinabove described. After this piece of tubing has been acted upon to shape it to the form shown in Fig. 3, it is transferred, as hereinabove set forth, to the position shown in dotted line in Fig. 7 or as shown in Fig. 8. Another straight length of tubing is then positioned within the clamping assembly 58.

When the manually movable valve part 391 of valve 390 is moved to the position shown in solid line in Fig. 26, liquid flows from the source of liquid pressure 384 through lead 386 and the valve inlet 388 into one side of the valve and therefrom through an outlet 394 into a line 396. The lower branch of the line 396 communicates with a line 398. Line 398 leads to each of the two cylinders 94 which carry the pistons 98 and in response to the liquid pressure, the pistons are moved outwardly from the positions shown in Figs. 7 and 34 to that shown in Figs. 8 and 9 with the results heretofore described.

Line 396 has an upwardly extending branch and the liquid moves therethrough into line 400 which has two branches, one leading into one cylinder 196 and the other leading into the other cylinder 196. When liquid enters the two cylinders 196 behind the pistons 194 therein, these pistons are moved outwardly from the positions shown in Figs. 7 and 26 to the positions shown in Figs. 8 and 9. Such action clamps both tubular sections into place as shown in Figs. 8 and 9.

When the valve 390 is disposed as shown in Fig. 26 in solid line, the valve 392 would normally have its movable valve member 393 positioned as illustrated in dotted line in Fig. 26. In such position the liquid pressure would be through the valve 392 and outlet 402 and line 404 to line 406. Line 406 has one branch leading to one cylinder 150 and another branch leading to the other cylinder 150 to hold the pistons withdrawn into the cylinders as shown in Fig. 26. A branch line 408 leads from each branch of the line 406, one branch 408 leading to one cylinder 258 and the other branch 408 leading to the other cylinder 258 holding the two pistons 256 withdrawn within the two cylinders 258 as illustrated in Fig. 26. The piston and cylinder assemblies which actuate the tube forming assemblies 100 and 200 are therefore held inactive while the pistons 98 and 194 are moved as described.

In the operation just described the return lead from one cylinder 196 is through line 410 to line 412 which line 412 extends between the two cylinders 194 and forms a return lead therefrom. Line 412 discharges through a part of line 414, valve inlet 416, one side of the valve 390, and through valve outlet 418 into line 420 which line 420 leads back to the reservoir 380. The other cylinder 196 has a return line 422 which also communicates with the inlet 416 into the valve 390 to flow therethrough and through the outlet 418 and line 420 to the reservoir. In the hydraulic system rigid or flexible leads may be provided as desired. The connections with moving cylinders is through flexible leads as heretofore stated.

The valve 390 may be left as described with the pressure on the pistons 98 and 194 to hold the clamping mechanisms at the positions shown in Figs. 8 and 9 against the tubes. The valve 392 may now be moved from the position shown in dotted outline to that shown in solid line. In the solid line position liquid pressure will be into the valve from lead 386 through valve inlet 424 and through the valve and outlet 426 into line 428. Line 428 communicates with a line 430 which has one branch leading to one cylinder 150 and another branch leading to the other cylinder 150.

Line 430 has a lead 432 which extends to one cylinder 258 and has another lead 434 which extends to the other cylinder 258 of this pair of cylinders.

When the pressure enters these cylinders 150 and 258 behind the pistons 148 and 256, these pistons are moved from positions shown in Fig. 26 to positions as hereinabove described to rotate the gears 104 and 224 and cause the tube sections to wrap around the gear segments 102 and 266 as hereinabove described.

The liquid return from the cylinder 150 upon movement of the pistons outwardly is through outlets 436 which communicate with line 406 and through 404, valve inlet 402, valve 392 and return line 420 lead back to the reservoir 380. The liquid return from the cylinders 258, upon movement of the pistons outwardly, is through outlets 408, lines 406, 404, 402 and valve 392 and line 420 to the reservoir.

The hydraulic diagram shown in Fig. 34 is that provided to operate the mechanism shown in Figs. 27 through 33. In this mechanism there are two pairs of hydraulic piston and cylinder assemblies. One pair of hydraulic piston and cylinder assemblies includes cylinders 356 which carry pistons 362 which swing the tube holding and bending blocks 348 to hold the tube frame up against the forming segments 312. The other pair of cylinder and piston assemblies includes cylinders 332 provided with pistons 336 which actuates the racks 316 to roll the gears 310 to wrap the tubes about the segments 312.

The hydraulic system shown in Fig. 34 includes a reservoir 440 for liquid which communicates through a lead 442 with a liquid pressure source 444. The source of liquid pressure 444 has a line 446 which extends to two valves 448 and 450, respectively. When the pistons 362 are disposed as shown in Fig. 27, the tube holding blocks 248 are down so as to permit insertion of the tubular frame as shown in Fig. 27. When it is desired to lift this frame from the position shown in Fig. 27 to that shown in Fig. 29, the valve member 449 of valve 448 is moved to the position shown in solid line in Fig. 34. In such position liquid pressure moves from the source 444 through lead 446, valve inlet 452, into and through the valve 448 and out of the valve through a lead 454 to a line 456. This line 456 has two branches which lead to the two cylinders 356. When the pressure is built up in these cylinders, the pistons 362 are advanced from the positions shown in Fig. 27 to that shown in Fig. 29.

The return of liquid from these cylinders 356 is through a return line 458 which leads from each cylinder 356 and through a line 460 back through the valve 448 and out of the valve through an outlet 462 and a line 464 communicating with such outlet and leading to the reservoir 440.

When the valve 448 has its valve member 449 positioned as shown in solid line in Fig. 34, the rotatable valve member 451 of valve 450 is normally initially disposed as shown in dotted line. After the pistons 362 have been advanced and the tubular frame elevated to the position shown in Fig. 29 and clamped to the forming segments of the gear wheels as heretofore described, the valve member 451 is moved from the dotted line position of Fig. 34 to the solid line position there shown. The valve 448 will be left in the position shown in solid line during this operation of valve member 451.

When the valve member 451 is positioned as shown in solid line in Fig. 34, liquid pressure enters one side of the valve 450 through a lead 466 from line 446 and flows through the valve and out through an outlet 468. The outlet 468 leads to a line 470 which has two branches. One branch leads to one cylinder 332 and the other branch leads to the other cylinder 332 of this pair of cylinders. When liquid pressure enters these cylinders 332 behind the pistons 336 therein, such pistons being withdrawn into the cylinders as shown in Fig. 34, the pistons are moved outwardly from the positions shown in Figs. 34 and 27 to that shown in Fig. 32. The return for liquid from these cylinders 332 is through leads 472 into line 474 which communicates through a line 476 with one side of the valve 450 and flows therethrough and through the line 464 back to the reservoir 440. As stated heretofore the leads of the hydraulic system are rigid or flexible as the situation demands. The showing in Figs. 26 and 34 is diagrammatic only.

What I claim is:

1. Tube bending mechanism comprising, in combination, a generally upright foundation board, clamping means adapted to secure a tube to one face of the board, a pair of tube engaging blocks swingably mounted upon the board, each block having a tube engaging linear face, means operable to move said blocks to engage the tube at spaced points and to bend opposite ends of the tube and to support said bent ends along linear paths, a pair of racks mounted upon the board one parallel to each of said linear paths, a gear supported to revolve over each rack, a tube forming part having an arcuate tube forming face secured to each gear to rotate therewith, means for clamping opposite end portions of a tube to said tube forming parts to wrap thereabout as the parts revolve with the gears, and means for revolving said gears along said racks toward each other.

2. Tube bending mechanism comprising, in combination, means for holding a portion of a straight length of tubing with one end projecting beyond the holding means, a tube forming roll supported for rotation and translation along a determined path generally lengthwise of the end of the tube projecting beyond the support but angularly with respect thereto, said roll having a grooved arcuate tube forming face, a tube supporting block having a grooved arcuate tube supporting face adapted to provide a seat for a length of tubing, said block swingably supported beyond the tube holding means to be swung to engage the projecting end of tubing to bend the same to and to support the same at a position parallel to the path of translation of the roll, means for clamping said projecting end of tubing to the tube forming face of the roll, and means for advancing the roll revolvably lengthwise of the block supported projecting end of tubing to wrap the tubing about the roll.

3. Tube bending mechanism comprising, in combination, tube supporting means adapted to hold the intermediate portion of a length of tubing in a straight line supported position with the ends thereof projecting beyond the supporting means, a tube forming roll supported for rotation and translation along a path extending generally lengthwise of but angularly with respect to a projecting end of the tubing beyond said supporting means, said roll provided with a grooved arcuate tube forming face, a block pivotally supported beyond one end of the supporting means adapted to be swung from a position on one side of the projecting end of tubing to bend the same to a position parallel to the path of translation of the roll and to support the same at said last named position, means for clamping the projecting end of the tubing to the tube forming face of the roll, and means for advancing the roll along its path of translation to wrap that portion of the tubing clamped thereto about the roll.

4. Tube bending mechanism comprising, in combination, clamping means adapted to hold a portion of a length of tubing in a straight line position with one end of the tubing projecting beyond said means, a tube forming roll having a grooved arcuate tube engaging face, said roll supported for rotation and translation along a path extending angularly with respect to the straight line supported portion of the tube, a tube engaging block swingably supported beyond one end of said clamping means to be swung to engage and bend that end of the tube projecting beyond said means to a position parallel to the path of translation of the roll, means for clamping the projecting end of the tube adjacent to one end of the block to the tube forming face of the roll, and means for advancing the roll along its path of translation to wrap the block supported portion of the tube thereabout.

AXEL V. BROGREN.

REFERENCES CITED

The following references are of record in the file of this patent:

UNITED STATES PATENTS

| Number | Name | Date |
|---|---|---|
| 80,627 | Heywood | Aug. 4, 1868 |
| 357,716 | Kent | Feb. 15, 1887 |
| 670,167 | Wood | Mar. 19, 1901 |
| 829,838 | Brown | Aug. 28, 1906 |
| 1,252,123 | Kitouski | Jan. 1, 1918 |
| 1,288,965 | Nelson | Dec. 24, 1918 |
| 1,309,238 | Brinkman | July 8, 1919 |
| 1,318,968 | Claybourn | Oct. 14, 1919 |
| 1,849,181 | Francis | Mar. 15, 1932 |
| 1,901,762 | Meyer | Mar. 14, 1933 |
| 2,041,365 | Mitchell | May 19, 1936 |
| 2,097,692 | Fiegel | Nov. 2, 1937 |
| 2,286,255 | Brooks | June 16, 1942 |
| 2,341,178 | Duer | Feb. 8, 1944 |
| 2,402,478 | Woodburn | June 18, 1946 |

FOREIGN PATENTS

| Number | Country | Date |
|---|---|---|
| 657,817 | France | Jan. 21, 1929 |
| 697,083 | France | Oct. 21, 1930 |
| 706,973 | France | Apr. 4, 1931 |